3,642,807
CERTAIN 1-/DILOWER-ALKYL AMINO-LOWER-ALKYL/-2-PHENYL INDOLIZINES AND QUATERNARY SALTS THEREOF
Lewis A. Walter, Madison, N.J., assignor to Schering Corporation, Bloomfield, N.J.
No Drawing. Continuation-in-part of application Ser. No. 854,015, Aug. 11, 1969, which is a continuation of application Ser. No. 571,426, Aug. 10, 1966. This application June 18, 1970, Ser. No. 47,636
Int. Cl. C07d 31/42
U.S. Cl. 260—296 B     8 Claims

ABSTRACT OF THE DISCLOSURE

The tangible embodiments of this invention involve the tertiary amino-1-diloweralkylamino lower alkyl-2-phenyl indolizines. These compounds are of pharmacological importance in that they exert valuable influence on the central nervous system of animals, varying from depressants to stimulants, depending on the embodiment under test, the dose administered and the animal species used. These amines may be administered orally as the free base form or in the form of their non-toxic acid addition salt.

The tertiary amines of this invention are intermediates for preparing the corresponding lower alkyl or phenyl lower alkyl quaternary salts wherein the latter exhibit anti-microbial action against a broad spectrum of organisms in standard vitro tests. The quaternaries, additionally are effective against the mouse pinworm *Syphacia obvelata*, and are, therefore, suited for disinfection of cages, laboratory, equipment, floors and tables.

CROSS REFERENCES TO RELATED APPLICATIONS

This application is a continuation-in-part of Ser. No. 854,015 filed Aug. 11, 1969 which in turn is a continuation application of Ser. No. 571,426 filed Aug. 10, 1966, now abandoned.

This invention relates to novel compositions of matter classifiable in the field of organic chemistry as 2-phenyl-indolizines. More particularly, this invention relates to 1-tertiary amino lower alkyl-2-phenylindolizines, pharmaceutically acceptable quaternary salts thereof and to methods of making such compositions.

The invention sought to be patented in one of its composition aspects is described as residing in the concept of a chemical compound having the molecular structure of a 2-phenyl-indolizine (and the 5, 6, 7, 8 tetrahydro analog thereof) to which there is attached at the 1-position a tertiary amino lower alkyl group.

The invention sought to be patented in another of its composition aspects is described as residing in the concept of a pharmaceutically acceptable quaternary salt of the aforementioned tangible embodiment.

The invention sought to be patented in its process aspect is described as residing in the concept of preparing quaternary salts of the free base tangible embodiment described hereinabove by reaction of said free base with a quaternizing agent so as to produce a pharmaceutically acceptable quaternary salt.

The quaternary salts of this invention possess the applied use characteristic of exerting an anti-microbial action as demonstrated by in vitro tests on representative bacteria, yeast and fungi when cultivated on agar plates. The salts are also anthelmintic in character by virtue of their action against pinworms. The preferred use of the tertiary amines is as intermediates in the preparation of the quaternary salts.

The tangible embodiments of this invention may be represented as members of the group consisting of tertiary amines having the following formula:

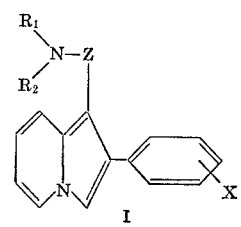

and the pharmaceutically acceptable quaternary salts thereof, wherein X represents hydrogen, halogen, lower alkyl or lower alkoxy; $R_1$ and $R_2$ represent lower alkyl or together with the nitrogen to which they are attached represent a nitrogen heterocycle having 5–6 cyclic members and Z represents an alkylene bridge being either straight or branched chain having 1 to 4 carbon atoms.

As used herein, the term lower alkyl means saturated hydrocarbon radicals of up to and including 6 carbon atoms, and, include both straight and branched chain groups. Representative of such groups are methyl, ethyl, propyl, butyl, pentyl and hexyl and their branched chain isomers. The term lower alkoxy means a lower alkyl group attached to an ether oxygen and is similarly limited to 6 carbon atoms.

When $R_1$ and $R_2$ together with the nitrogen atom to which they are attached form a nitrogen heterocycle having 5–6 cyclic atoms, the group so formed is represented by pyrrolidino, piperidino, morpholino and piperazino which themselves may contain additional alkyl or hydroxy alkyl substituents.

The term "pharmaceutically acceptable quaternary salts" as used herein designates the reaction product of the tertiary amine tangible embodiment with a lower alkyl or phenyl lower alkyl ester of an inorganic acid. Exemplary of such acids are hydrohalic (preferably chloride, bromide or iodide), sulfuric and the like. Representative of such salts are those formed by reacting the tertiary amine embodiment with, for example, a lower alkyl halide such as methyl iodide, ethyl bromide, butyl chloride, or with benzyl chloride or phenethyl bromide; or with dimethylsulfate or diethylsulfate. Other anions may be introduced directly by quaternizing in the usual manner or indirectly, in a known manner such as, by reacting a quaternary chloride with silver nitrate of phosphate or acetate whereby anion exchange occurs with the insoluble silver chloride precipitating.

The tertiary amines of this invention are preferably prepared by the reaction of a 2-pyridyl-lower alkanoyl amide bearing $R_1$ and $R_2$ substituents on the amido nitrogen, with an α-bromoacetophenone to yield a phenacyl pyridinium bromide. Exemplary of the foregoing, N,N-dimethyl-3(2-pyridyl) propionamide (II) with an α-bromoacetophenone yields the phenacyl pyridinium bromide (III). The α-bromoacetophenone reagent optionally may bear the substituents X on the benzene ring, X being as heretofore defined. The formation of the phenacyl pyridinium halide (III) is effected in a known manner usually by admixing the reactants and heating until reaction is initiated after which time an exothermic reaction occurs. Upon treatment with mild aqueous base, such as saturated sodium bicarbonate solution or aqueous alkali, Compound III undergoes intramolecular condensation forming the amide, IV. Reduction of the amide, with lithium aluminum hydride, for example, results in the formation of the tertiary amino embodiment of Formula I. This sequence of reactions is depicted by the following scheme:

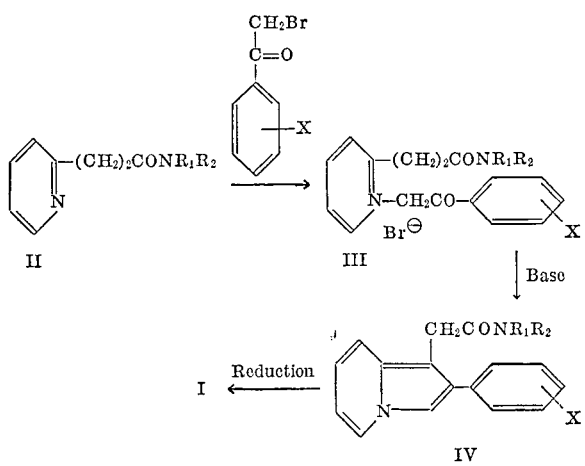

In the foregoing reaction the length of the alkylene bridge Z in Formula I is shown as being two carbon atoms, and $R_1$ and $R_2$ are methyl, however, these are variable dependent upon choice of starting material. Reaction of the tertiary amine produced, with a quaternizing agent, either with or without solvent, as described herein, yields the appropriate pharmaceutically acceptable quaternary salt.

Alternatively, the tertiary amines of this invention are preparable by reacting a 2-pyridyl lower alkyl primary amine with a chlorocarbonic ester giving rise to an N-carbalkoxy-(2-pyridyl)-lower alkyl amine, which upon reaction with an α-bromoacetophenone followed by treatment with base and then reduction as described above, results in the formation of a compound having Formula I except that $R_1$ is hydrogen. N-alkylation is effected in the usual manner, such as, by reaction of the secondary amine with an alkyl halide obtaining a tertiary amine of this invention.

The tertiary amines obtained by the foregoing reactions may be converted to their 5, 6, 7, 8 tetrahydroanalogs by catalytic hydrogenation in the presence of Raney nickel at from 15 to 60 p.s.i.g. in a suitable solvent, such as, an alkanol for example.

As indicated, the tertiary amines may be reacted with quaternizing agents by admixture in a suitable solvent and allowing the reaction to proceed at a convenient temperature for from a few hours up to several days followed by collection of the insoluble product by filtration. By suitable solvent is meant one in which the reactants are soluble but the quaternary salt is not (such as ethyl ether or tetrahydrofuran). Polar solvents can be used, such as alkanols, however, the quaternary salts may be soluble in such solvents and may be recoverable therefrom by concentration and crystallization or by addition of a miscible non-polar solvent as a precipitant.

The quaternary salts of this invention are broad spectrum antimicrobial agents exhibiting a potent anti-microbial action against such organisms as *Staphylococcus aureus, Streptococcus pyogenes c., Escherichia coli, Salmonella schottmuelleri, Candida albicans* and *Trichophyton mentagrophytes* in standard in vitro tests. The quaternaries, additionally, are effective against the mouse pinworm, *Syphacia obvelata*, and are, therefore, suited for the disinfection of cages, laboratory equipment, floors and tables. In disinfecting cages, the quaternary salts may be applied to the mature pinworm, or applied to their larvae; both forms being excreted in the droppings of infected animals. These compounds provide both a useful substitute and adjunct to present disinfection practice. These tangible embodiments, being quaternary salts, may be used as aqueous solutions or suspensions in concentrations up to 10% (weight to volume) in combination with soaps and detergents or utilized alone as a final lavage in areas being disinfected.

The tertiary amine tangible embodiments are of pharmacological importance in addition to being useful intermediates. They exert a valuable influence on the central nervous system of animals, varying from depressants to stimulants depending on the embodiment under test, the dose administered and the animal species used. These amines may be administered orally in the free base form or in the form of a non-toxic acid addition salt (such as hydrochloride, maleate, sulfate and the like).

Example 1.—1-[2-(N-methylmorpholinium)ethyl]-2-phenylindolizine bromide (A) Dissolve 20 g. of ethyl 3-(2-pyridyl)-propionate in 50 g. of morpholine and add 1 g. of sodium methylate. Reflux the solution for 8 hours and distill the excess morpholine in vacuo. Dissolve the residue in ether, wash with water, dry over anhydrous potassium carbonate, filter and distill the filtrate to give 3-(2-pyridyl) propionyl morpholide, B.P. 150°–160° at 1 mm.

(B) Mix 5 g. of the product from A with 4.5 g. of α-bromo-acetophenone and warm slowly to 85° C. whereupon a vigorous reaction is initiated. Remove the heat source until the reaction moderates, continue the heating for 2 hours on a steam bath. Cool the mixture and shake it with 100 ml. of ether and with 100 ml. of water. Separate the layers and heat the aqueous solution on a steam bath with 50 ml. of saturated sodium bicarbonate for 40 minutes. The greenish-brown phenylindolizine compound separates out upon cooling. Extract the product with ether and dry the ethereal solution over anhydrous potassium carbonate. Filter the solution and add it slowly to a stirred refluxing mixture of 5 g. of lithium aluminum hydride in 500 ml. of ether under a nitrogen atmosphere. Continue refluxing the mixture for 5 hours after the addition is complete. Cool the reaction mixture, add 4.5 ml. of water dropwise followed by 4.5 ml. of 15% sodium hydroxide and finally another 14 ml. of water. Allow the reaction mixture to stand for 1 hour then filter to remove the precipitated inorganic salts. Wash the salt cake with ether and dry the ether filtrate and washes over anhydrous potassium carbonate. Filter the dried solution and saturate it with methyl bromide. Close the container and keep it in the dark at room temperature for 2 days. Collect the precipitate consisting of the 1-[2-(N-methylmorpholinium)ethyl]-2-phenylindolizine bromide by filtration and dry in vacuo.

Example 2.—1-[2-(methylmorpholinium)ethyl]-2-phenyl-5,6,7,8-tetrahydroindolizine bromide Dissolve 1.0 gm. of the product of Example 1 in 150 ml. of water in a Parr hydrogenation bottle and add 0.5 gm. of Raney nickel. Hydrogenate at 60 p.s.i.g. until the hydrogen uptake essentially ceases. Filter off the catalyst and remove the solution in vacuo to a residue and collect the title compound. Crystallize the residue from alcohol-ether to obtain the product of this example.

Example 3.—1-[3-N,N-dimethylamino)propyl]-2-phenylindolizine (A) Dissolve 7.5 g. of N,N-dimethyl-4-(2-pyridyl)-butyramide in 250 ml. of dry benzene at reflux. Add 10 g. of 2-bromoacetophenone and continue refluxing for 24 hours. Filter the precipitated quaternary salt and wash with dry benzene. Dissolve the precipitate in a mixture of 150 ml. of water and 100 ml. of ether. Separate the layers, add to the aqueous layer 100 ml. of saturated sodium bicarbonate solution and heat the mixture on a steam bath for forty-five minutes. Extract the precipitate of 1-(3-N,N-dimethylpropionamido)-2-phenylindolizine with 100 ml. of ether. Dry the ethereal extract over anhydrous potassium carbonate and concentrate to obtain crystalline 1-(3-N,N-dimethyl propionamido)-2-phenylindolizine M.P. 93°–95°.

(B) Dissolve 7.5 g. of the crystalline amide in 70 ml. of dry ether and add this solution dropwise to a stirred, refluxing suspension of 3.5 g. of lithium aluminum hydride in 500 ml. of ether. Continue refluxing and stirring the reaction for 6 hours. Cool the reaction mixture and treat consecutively with 3 ml. of water, 3 ml. of 15% sodium hydroxide and 10 ml. of water. Filter the precipitated salts, after having allowed the mixture to stir for 1 hour. Wash the inorganic precipitate with ether. Combine the filtrate and the washes and dry over anhydrous potassium carbonate. Filter and concentrate the filtrate to a residue under an inert atmosphere. The 1-(3-N,N-dimethylaminopropyl)-2-phenylindolizine is obtained as a light yellow oil weighing 7 g.

Example 4.—1-[3-(trimethylammonium)-propyl]-2-phenylindolizine bromide

Dissolve 5.0 gms. of the product of Example 3 in 500 ml. of dry ether and saturate with methyl bromide. Close the container and keep it in the dark at room temperature for 2 days. Collect the 1-(3-trimethylammoniumpropyl)-2-phenylindolizine bromide by filtration and wash the solids free of entrapped filtrate with fresh anhydrous ethyl ether. Dry in vacuo to obtain to product of this example.

Example 5.—1-[2-(N,N-dimethylamino)ethyl]-2-phenylindolizine (A) 3-(2-pyridyl)-propylamine.—Saturate a solution of 52 g. of 3-(2-pyridyl)-propionitrile in 400 ml. of ethanol with ammonia. Hydrogenate at 70°–75° in the presence of 10 gms. of Raney nickel catalyst and under 500 p.s.i. Filter the suspension and concentrate the fistrate to a residue. Distill the residue in vacuo, B.P. 114°–117° (4 mm.) to obtain 3-(2-pyridyl)-propylamine ($n_D^{25}$= 1.5135).

(B) N-carbethoxy-3-(2-pyridyl)-propylamine. — Dissolve 34 g. of the amine prepared in (A) and 5 g. of pyridine in 150 ml. of chloroform with stirring and cool to below 40°. Add 33 g. of ethyl chlorocarbonate, allow the reaction to proceed for several hours, add 25 ml. of water and stir for two hours. Add a solution of sodium hydroxide with cooling and stirring and continue the addition until the reaction mixture is very alkaline. Separate the chloroform layer and after drying over anhydrous sodium carbonate remove the solvent by distillation. Distill the residue to obtain 46 g. N-carbethoxy-3-(2-pyridyl)-propylamine, B.P. 137°–140° C. (3 mm.) $n_D^{25}$=1,5091.

(C) N-methyl-3-(2-pyridyl)-propylamino.—Add dropwise 27.5 g. of the carbethoxy compound from step (B) to a stirring and refluxing suspension of 10 g. of lithium aluminum hydride in 500 ml. of ether. Continue the reaction for six hours; cool the mixture and treat consecutively with 9 ml. of water, 9 ml. of 15% sodium hydroxide and 27 ml. of water. Stir the reaction mixture for one hour, filter the resulting suspension of inorganic salts and wash with ether. Combine the ether filtrate and washes; evaporate to a residue and distill the residue in vacuo to yield 18 g. of N-methyl-3-(2-pyridyl)-propylamine, B.P. 65–69° C. (2 mm.) $n_D^{25}$=1.4983.

(D) N - methyl - N - carbethoxy - 3 - (2 - pyridyl)-propylamine.—Treat the compound from step (C) with ethyl chlorocarbonate as described in step (B) and from the compound of this example, B.P. 132°–134° (3 mm.) $n_D^{25}$=1.4983.

(E) 1 -[2 - (N,N - dimethylamino)ethyl]-2-phenylindolizine.—Reflux 18 g. of the product of step (D) with 20 g. of α-bromoacetophenone in 500 ml. of dry benzene for 24 hours. Separate the precipitated quaternary salt by decanting the solvent. Dissolve the salt in a mixture of 150 ml. of water and 100 ml. of ether and separate the layers. Heat the aqueous layer on a steam bath with 100 ml. of saturated sodium bicarbonate solution for forty-five minutes. Extract the precipitated 1-(2-N-methyl-N-carbethoxyaminoethyl)-2-phenylindolizine with ether, dry over anhydrous potassium carbonate, filter and reduce with lithium aluminum hydride, as in step (C), to yield 1-[2-(N,N-dimethylamino)ethyl]-2-phenylindolizine.

Example 6.—1-[2-(N,N-dimethylamino)ethyl]-2-phenyl - 5,6,7,8 - tetrahydroindolizine Dissolve 8 g. of 1-[2-(N,N-dimethylamino)ethyl]-2-phenylindolizine in 160 ml. of alcohol and hydrogenate at 60 p.s.i. using 5 g. Raney Nickel as the catalyst. Filter the suspension discard the catalyst and remove the alcohol in vacuo. The 1 - [2 - (N,N - dimethylaminoethyl]-2-phenyl - 5,6,7,8 - tetrahydroindolizine remains as a yellow brown oil with a blue fluorescence which conversion to a mono hydrochloride is a known manner yields a product melting 211°–214° C.

Example 7.—1-[2-trimethylammonium)ethyl]-2-phenylindolizine methosulfate

Dissolve 10 gms. of 1-(2-N,N-dimethylaminoethyl)-2-phenylindolizine, the product of Example 5 in 1000 ml. of ethyl ether and treat with dimethyl sulfate for two days at room temperature. Collect the 1-[2-(trimethylammonium)ethyl]-2-phenylindolizine methosulfate precipitate by filtration from the reaction mixture.

Example 8.—1-[3-(N-benzyl-N,N-dimethylammonium)-propyl]-2-phenylindolizine chloride Add 5 grams of the product of Example 3(A) in 150 ml. of dry ether slowly to a stirred refluxing mixture of 2 g. lithium aluminum hydride in 200 ml. of ethyl ether. Blanket the mixture with nitrogen and maintain at reflux for 5 hours. Cool the reaction mixture and add 2 ml. of water dropwise, followed by 2 ml. of 15% sodium hydroxide and subsequently by 6.0 ml. of water. Allow the reaction mixture to stand for one hour and filter. Wash the inorganic salts with ether and combine the filtrate and washes. Dry the ethereal layer over anhydrous potassium carbonate. Filter the dried solution and concentrate to a residue. Dissolve the residue in 100 ml. of dry benzene and add 4.0 gms. of benzyl chloride. Blanket the reaction mixture with nitrogen and warm to 50° C. The quaternary salt separates as an oil which crystallizes on standing. Isolate the product of this example by filtration, wash with benzene and vacuum dry.

Example 9.—1-[3-(N-benzyl-N,N-dimethylammonium)-propyl]-2-phenylindolizine nitrate Dissolve 1.0 g. of the product of Example 8 in 10 ml. of distilled water and add 5.0 ml. of a solution containing 0.45 g. silver nitrate with stirring. Age the reaction mixture until the silver chloride precipitate coalesces, filter using a filter aid and evaporate the filtrate to a residue in vacuo to yield the title product.

Example 10.—1-[3-(trimethylammonium)propyl]-2-phenyl-5,6,7,8-tetrahydroindolizine bromide Dissolve 5 gm. of the product of Example 4 in 150 ml. of water in a Parr hydrogenation bottle and add 3 g. of Raney nickel. Hydrogenate at 45–60 p.s.i.g. until the hydrogen uptake essentially ceases. Filter to remove the catalyst and evaporate the filtrate to a residue in vauco to give the 1-[3-(trimethylammonium)propyl]-2-phenyl-5,6,7,8-tetrahydroindolizine bromide.

The subject matter which applicant regards as his invention is particularly pointed out and distinctly claimed as follows:

I claim:

1. A compound having the structural formula:

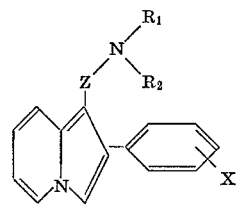

and the N-lower alkyl and N-phenyl lower alkyl quaternary salts thereof, wherein X is a member of the group consisting of hydrogen, halogen, lower alkyl or lower alkoxy; $R_1$ and $R_2$ are each lower alkyl; Z is an alkylene bridge having 1 to 4 carbon atoms.

2. A compound of claim 1 wherein $R_1$ and $R_2$ are lower alkyl, X is hydrogen and Z is ethylene.

3. A compound of claim 2 wherein $R_1$ and $R_2$ are methyl said compound being 1-[2-(N,N-dimethylamino)ethyl]-2-phenylindolizine.

4. A compound of claim 2 wherein Z is propylene, and $R_1$ and $R_2$ are lower alkyl.

5. A compound of claim 4 wherein $R_1$ and $R_2$ are methyl, said compound being 1-[2-(N,N-dimethylamino)propyl]-2-phenylindolizine.

6. A compound of claim 1 wherein $R_1$ is benzyl, $R_2$ is methyl, X is hydrogen and Z is propylene, said compound being 1-[3-(N-benzyl-N,N-dimethylammonium)-propyl]-2-phenylindolizine chloride.

7. A compound of claim 1 wherein $R_1$ and $R_2$ are methyl, Z is ethylene and X is hydrogen, said compound being 1 - [2-(trimethylammonium)ethyl - 2 - phenylindolizine bromide.

8. A compound of claim 1 wherein $R_1$ and $R_2$ are methyl, Z is propylene and X is hydrogen, said compound being 1-[2 - (trimethylammonium)propyl] - 2 - phenylindolizine bromide.

References Cited

UNITED STATES PATENTS 3,517,019   6/1970   Alaimo _____ 260—296 B

OTHER REFERENCES

Harrell et al.; Journal of Pharmaceutical Science, vol. 57 (11), pp. 1989–91 (1968).

ALAN L. ROTMAN, Primary Examiner

U.S. Cl. X.R.

260—247.5 B, 268 BC, 293 A, 294.8 R, 295 AM, 295 K, 296 R, 999